UNITED STATES PATENT OFFICE.

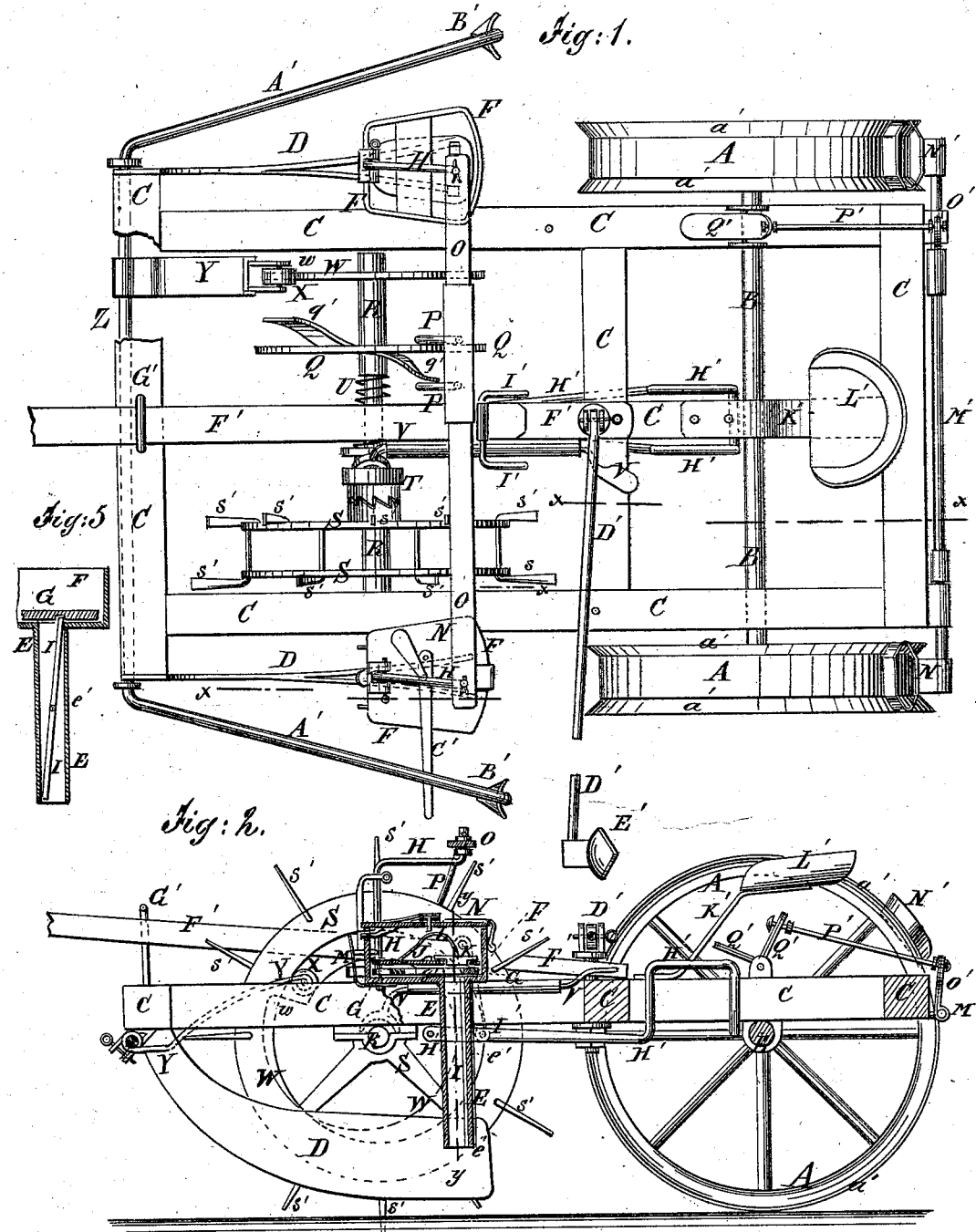

CHARLES A. ANDERSSON, OF MINERAL RIDGE, IOWA.

IMPROVEMENT IN CORN-PLANTERS.

Specification forming part of Letters Patent No. 174,179, dated February 29, 1876; application filed September 6, 1875.

*To all whom it may concern:*

Be it known that I, CHARLES A. ANDERSSON, of Mineral Ridge, in the county of Boone and State of Iowa, have invented a new and useful Improvement in Corn-Planters, of which the following is a specification:

Figure 1 is a top view of my improved corn-planter. Fig. 2 is a vertical longitudinal section of the same, taken through the line $x\,x\,x\,x$, Fig. 1. Fig. 3 is a detail side view of an attachment for the wheel that operates the dropping device. Fig. 4 is an edge view of the wheel that operates the dropping device, shown as arranged for dropping the hills close together. Fig. 5 is a detail section taken through the line $y\,y$, Fig. 2.

Similar letters of reference indicate corresponding parts.

The object of this invention is to furnish an improved corn-planter which shall be so constructed as to plant the corn accurately without previously marking the land, which shall be simple in construction, easily manipulated, not liable to get out of order, and can be readily changed from a self-dropper to a hand-dropper, as desired.

The invention consists in combining, with a seed-hopper having perforated walls and false bottom, a spring having points that pass through and hold the bottom; also, in combining seed-plates and crank-levers, connected by a rod having pairs of arms, with a rotary wheel having two inclines diametrically opposite and on different sides.

A are the wheels, which revolve upon the journals of the axle B, and the rims of which are made wide and have flanges $a'$ formed upon their edges. The flanges $a'$ project at an angle of about forty-five degrees from the face of the rims of the wheels A, as shown in Fig. 1, so as to pack the soil upon the seed and cover it. To the axle B is attached, and upon it rides, the rear part of the frame C. To the projecting ends of the front cross-bar of the frame C are attached the forward ends of the runners D, by which channels are opened to receive the seed. The rear ends of the runners D are forked, and in the openings thus formed are secured the lower ends of the dropping-spouts E, the upper ends of which are attached to the side bars of the frame C, and to them are attached the seed-hoppers F. The rear sides of the spouts E are made open, and are closed by glass plates $e'$, so that the driver from his seat can see the seed as it drops through the said spouts, and can thus know that the dropping device is operating properly. The seed-hoppers F are also attached to the side bars of the frame C. Upon the bottoms of the seed-hoppers F are placed plates G, which are attached at one end to the lower ends of the cranks H, which work in bearings attached to the walls of the hoppers F, so that the plates G may be vibrated by the rocking of the cranks H. In the plate G are formed two holes to receive the seed and convey it to the conductor-spouts E, through which it passes to the ground. The size of the holes in the dropping-plates G is regulated to drop the amount of seed required for a hill by a gage-plate, $g'$, secured adjustably to the said plate G. In the lower side of the dropping-plate G is formed a cavity to receive the upper end of a plate, I, that passes down through and is pivoted to the spout E, to serve as a valve to receive the seed from the dropping-plate G and drop it to the ground upon the next movement of said dropping-plate. J is a false bottom placed in the seed-hoppers F, above the dropping-plates G, and which rests upon flanges or cleats formed upon or attached to the walls of the said hoppers. The false bottoms have slots formed in them, directly above the dropping-holes of the plate G, to allow the seed to pass into said dropping-holes. In the middle part of the slot in the false bottom J is placed a plate or block, K, which is held down to its place by a spring, L, attached to said false bottom J, and which is designed to serve as a cut-off to prevent any more seed than enough to fill the dropping from being carried out by the dropping-plate G. The false bottom J is held down to its place by the spring-catch M, attached to the outside of the hoppers F, and provided with points, which pass in through the walls of said hoppers so as to be just above the said false bottom.

The hoppers F are provided with covers N, to prevent the seed from spilling out. The cranks H are connected by a cross-bar, O, so that they may always move together. To the under side of the cross-bar O are rigidly attached two arms, P, which project downward upon the opposite sides of the wheel Q. The wheel Q is rigidly attached to the shaft R, so as to be carried around by and with said shaft in its revolution. To the opposite sides of the rim of the wheel Q, and at the distance of half a circumference from each other, are attached inclines q', which strike alternately against the alternate arms P, so that the bar O may be operated to drop the seed by the revolution of the wheel Q.

S is a wheel, the rim of which is made double, and has a number of radial spikes or arms, s', attached to it, the arms of the two rims alternating with each other. The arms s' are made with wedge-shaped points, so that they may take a sure hold upon the ground, and thus cause the wheels S to be revolved uniformly by the advance of the machine. The two rims and the alternate arms insure the uniform revolution of the wheel, even when the ground is uneven. The wheel S runs loosely upon the shaft R, and upon one end of its hub are formed teeth, which engage with the teeth of the clutch T, that slides longitudinally upon the shaft R, and is connected with the shaft by a tongue and groove, or other suitable means, so that it may carry said shaft with it in its revolution. The clutch T is held forward against the hub of the wheel by a spring, U, coiled around the shaft R, and which bears against the said clutch.

V is a lever, the forked end of which rides in a ring-groove in the clutch T. The lever V is pivoted to the central longitudinal bar of the frame C, and its rear end projects back into such a position that it may be readily reached and operated by the driver from his seat, to withdraw the clutch from the armed wheel S, and allow said wheel to revolve without operating the dropping device. To the shaft R is rigidly attached a wheel, W, upon the rim of which is formed one or two cams, w, as shown in dotted lines in Fig. 2. Upon the rim of the wheel W rests a small wheel, X, which is pivoted to the outer end of an arm, Y, the inner end of which is rigidly attached to a shaft, Z. The shaft Z works in bearings attached to the forward part of the frame C, and to its ends are attached, or upon them are formed, rods A', which project rearward and outward, are bent downward, and to their ends are attached plows, teeth, or points B'. With this construction, as the wheel X drops from the shoulder of the cam w' of the wheel W, the plows B' drop to the ground and mark it in line with the hills. When there is one cam upon the wheel W the plows B' will mark every other hill, and when there are two cams, w', upon the wheel W, the plows B' will drop and mark each hill. The rods A' project so far outward that the plows B' will be half the width of a row from the runners D, so that in passing across a field the inner plow B' will follow the last line of previous marks, and the outer plow will form a new line of marks for a guide in the next crossing. When turning and when passing from place to place, the plows B' may be supported away from the ground by an arm, C', pivoted to the covers N of the hoppers F. To the middle longitudinal bar of the frame C is swiveled and pivoted the end of a rod, D', to the outer end of which is attached a double plow or marker, E', so as to mark the ground when turned down upon either side of the machine. The rod D' is made of a length equal to the width of two rows, so that when turned down upon the outer side of the machine it may make a mark which will be midway between the runners upon the next crossing, and will thus serve as an additional guide to the driver in guiding the team.

When not required for use, the rod D' may be turned back to rest upon the rear part of the frame C. F' is the tongue, the rear end of which is pivoted or hinged to the middle part of the frame C, and which is kept in line with the length of the machine by a keeper, G', attached to the forward end of the frame C, and through which the said tongue F' passes. The keeper G' is made long, so that the forward part of the machine may have an up-and-down movement upon the said tongue F, to enable the runners D and wheel S to be raised from the ground when desired, for convenience in turning and in passing from place to place. H' is a lever, the forward end of which is pivoted to the lower side of the central longitudinal bar of the frame C, and its rear end is provided with arms, which project upward upon the opposite sides of the said central bar, so that the lever H' can be conveniently operated by the driver with his feet. I' is a loop or link, that passes around the tongue F' and the central longitudinal bar of the frame C. The upper end of the loop or link I' is pivoted to the upper side of the tongue F', and with its lower end is connected the lever H', so that by pressing the rear end of the said lever H' downward, when the forward end of the tongue F is in the neck-yoke of the team, the forward end of the machine will be raised, raising the runners D and the wheel S from the ground, and allowing the machine to be conveniently turned or drawn from place to place.

For planting broom-corn or other seed that requires the hills to be planted closer together, semicircular rings J' are attached to the alternate parts of the opposite sides of the rim of wheel Q, by means of bolts, pins, and keys, or other suitable fastenings. The sections J' are each provided with inclines j', to strike against the arms P of the bar O, and thus operate the dropping-plates.

In very rough or stumpy ground the shaft R and its wheels S Q W may be detached, and the bar O operated by hand. In this case a seat should be attached to the forward part of the frame C for the person that operates the said bar O. To the central longitudinal bar of the frame C, over or nearly over the axle B, is attached the lower end of the standard K' of the driver's seat L', which standard projects to the rearward, so that the driver's weight may assist in balancing the machine. M' is a shaft that works in bearings attached to the rear end of the frame C, and to the ends of which are attached scrapers N', of such a form as to fit upon the flanged faces of the wheels A a', to scrape off any soil that may adhere to said wheels. To the shaft M' is attached an upwardly-projecting rigid arm, o', to which is pivoted the rear end of a rod, P', the forward end of which is pivoted to the bent lever Q', which is pivoted at its angle to the frame C, in such a position that it may be readily operated by the driver with his foot, to apply the scrapers N' when desired.

Having thus described my invention, I claim as new and desire to secure by Letters Patent—

1. The combination, with seed-hopper having perforated walls and false bottom, of spring M, provided with points to pass through and hold down bottom, as set forth.

2. The combination of seed plates G and crank levers H H, connected by a rod, O, having pairs of arms, with a rotary wheel having two inclines diametrically and on different sides, as shown and described.

CHARLES A. ANDERSSON.

Witnesses:
AUGUSTUS ANDERSON,
CHAS. ERICKSON.